(12) United States Patent
Batra et al.

(10) Patent No.: US 9,117,464 B1
(45) Date of Patent: Aug. 25, 2015

(54) METHODS FOR MANUFACTURING HYBRID COILS FOR MAGNETIC WRITE HEADS USED IN STORAGE SYSTEMS

(71) Applicant: Western Digital (Fremont), LLC, Fremont, CA (US)

(72) Inventors: Sharat Batra, Plymouth, MN (US); Ut Tran, San Jose, CA (US); Zhigang Bai, Fremont, CA (US); Kevin K. Lin, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 137 days.

(21) Appl. No.: 13/932,332

(22) Filed: Jul. 1, 2013

Related U.S. Application Data

(62) Division of application No. 13/174,619, filed on Jun. 30, 2011, now Pat. No. 8,514,517.

(51) Int. Cl.
*H01F 7/06* (2006.01)
*G11B 5/17* (2006.01)

(52) U.S. Cl.
CPC ........................................ *G11B 5/17* (2013.01)

(58) Field of Classification Search
USPC ............... 29/603.07, 603.16, 603.23, 603.24, 29/603.26, 605; 360/123.03, 123.04, 360/123.31
See application file for complete search history.

(56) References Cited

U.S. PATENT DOCUMENTS

| | | | |
|---|---|---|---|
| 4,713,711 A | 12/1987 | Jones, Jr. et al. | |
| 4,985,985 A | 1/1991 | Das | |
| 5,703,740 A | 12/1997 | Cohen et al. | |
| 5,777,824 A * | 7/1998 | Gray | 360/234.8 |
| 5,875,080 A | 2/1999 | Seagle | |
| 5,995,342 A | 11/1999 | Cohen et al. | |
| 6,246,541 B1 | 6/2001 | Furuichi et al. | |
| 6,275,354 B1 | 8/2001 | Huai et al. | |
| 6,396,660 B1 | 5/2002 | Jensen et al. | |
| 6,483,662 B1 | 11/2002 | Thomas et al. | |
| 6,525,901 B1 | 2/2003 | Kamijima et al. | |
| 6,710,972 B1 | 3/2004 | Mochizuki et al. | |
| 6,728,065 B2 | 4/2004 | Batra et al. | |
| 6,870,705 B2 | 3/2005 | Hsiao et al. | |
| 6,940,688 B2 | 9/2005 | Jiang et al. | |
| 7,054,104 B2 | 5/2006 | Sasaki et al. | |
| 7,075,756 B1 | 7/2006 | Mallary et al. | |
| 7,126,788 B1 | 10/2006 | Liu et al. | |
| 7,206,168 B2 | 4/2007 | Sato et al. | |
| 7,248,433 B1 | 7/2007 | Stoev et al. | |
| 7,372,664 B1 | 5/2008 | Mallary et al. | |
| 7,443,632 B1 | 10/2008 | Stoev et al. | |

(Continued)

OTHER PUBLICATIONS

Office Action dated in U.S. Appl. No. 13/174,619, 13 pages.

(Continued)

*Primary Examiner* — Paul D Kim

(57) ABSTRACT

Methods for manufacturing hybrid coils for magnetic write heads used in disk drives are described. One such embodiment includes a magnetic read/write head including a read transducer, and a write transducer including a pair of write poles, a hybrid coil including a first coil having a pancake coil configuration with at least one turn positioned between the pair of write poles, and a second coil having a helical coil configuration including a plurality of turns positioned between the pair of write poles, the second coil coupled to the first coil, where the at least one turn of the first coil is interleaved with the turns of the second coil.

18 Claims, 7 Drawing Sheets

(56) References Cited

U.S. PATENT DOCUMENTS

| | | |
|---|---|---|
| 7,511,921 B2 | 3/2009 | Mallary et al. |
| 7,692,894 B2 | 4/2010 | Kobayashi |
| 7,768,744 B2 | 8/2010 | Hsiao et al. |
| 7,791,839 B2 | 9/2010 | Olson et al. |
| 7,826,175 B2 | 11/2010 | Yokoyama et al. |
| 8,514,517 B1 | 8/2013 | Batra et al. |
| 8,763,916 B1 * | 7/2014 | Foo et al. ............... 235/492 |
| 2002/0039254 A1 | 4/2002 | Taguchi et al. |
| 2002/0191350 A1 | 12/2002 | Emilio Santini |
| 2003/0030943 A1 | 2/2003 | Han et al. |
| 2003/0202278 A1 | 10/2003 | Chen et al. |
| 2004/0240106 A1 | 12/2004 | Iitsuka et al. |
| 2005/0207061 A1 | 9/2005 | Mochizuki et al. |
| 2006/0150397 A1 | 7/2006 | Basra et al. |
| 2006/0176601 A1 | 8/2006 | Amin et al. |
| 2008/0024912 A1 | 1/2008 | Mallary et al. |
| 2008/0112080 A1 | 5/2008 | Lengsfield et al. |
| 2009/0034121 A1 | 2/2009 | Ohta et al. |

OTHER PUBLICATIONS

Notice of Allowance dated in U.S. Appl. No. 13/174,619, 8 pages.

\* cited by examiner

METHODS FOR MANUFACTURING HYBRID COILS FOR MAGNETIC WRITE HEADS USED IN STORAGE SYSTEMS

REFERENCE TO RELATED APPLICATIONS

This application is a divisional of U.S. patent application Ser. No. 13/174,619, filed Jun. 30, 2011, now U.S. Pat. No. 8,514,517, entitled "SYSTEMS AND METHODS FOR PROVIDING HYBRID COILS FOR MAGNETIC WRITE HEADS", the entire content of which is incorporated herein by reference.

FIELD

The present invention relates to disk drive technology, and more specifically to systems and methods for providing hybrid coils for magnetic write heads used in disk drives.

BACKGROUND

An important advantage of the drive technology is high storage capacity at relatively lower cost compared to flash memory. In addition to areal density, increases in linear density for a given rpm and form factor of drive increase the maximum data rate. Server applications where access to large amounts of mission critical data is essential also requires high data rates. High data rates can be important for both conventional and electrically assisted magnetic recording (EAMR) recording technology. Innovations in head design, coil design and magnetic materials are necessary to achieve high data rates.

To achieve high data rates, coil designs can be important. Coil designs for writers can be used in both conventional perpendicular and EAMR heads. EAMR heads generally require a large write gap (e.g., about 1.5 um) as optics needs to be sandwiched between the main pole (P1) and the return pole (P2) compared to conventional perpendicular writers where write field gradient requires a small gap (e.g., about 30 nm) between the main pole and the return pole. Write gap length in the conventional perpendicular design needs to be matched to the distance between head to the soft under layer (SUL) in the media, which is typically about 30 to 40 nm from the air bearing surface (ABS). For EAMR designs, either the SUL generally needs to be completely removed or SUL generally needs to be deposited below the heat sink layer, thereby increasing distance between the head and the SUL. Because of the large write gap and larger distance between the head and the SUL layer, the EAMR design generally requires more coil turns to achieve head saturation for pre-amp current below approximately 50 mA. As a larger number of coil turns are often required, low inductance is needed to achieve high data rates. Therefore, a short yoke length and a helical coil are preferred over pancake coils typical of EAMR head designs. However, because of the short yoke and small coil pitch, the resistance of the helical coils can be large. The large coil resistance provides large write pole tip protrusion due to the close proximity of the coils to the return pole or P2. Therefore, an improved coil design can require reducing the coil resistance. As such, a coil design is needed that minimizes inductance and resistance while maintaining short yoke length.

SUMMARY

Aspects of the invention relate to systems and methods for providing hybrid coils for magnetic write heads used in disk drives. In one embodiment, the invention relates to a magnetic read/write head for a storage system, the read/write head including a read transducer, and a write transducer including a pair of write poles, a hybrid coil including a first coil having a pancake coil configuration including at least one turn positioned between the pair of write poles, and a second coil having a helical coil configuration including a plurality of turns positioned between the pair of write poles, the second coil coupled to the first coil, where the at least one turn of the first coil is interleaved with the turns of the second coil.

In another embodiment, the invention relates to a method for manufacturing a magnetic read/write head of a storage system, the method including forming a substrate including a read transducer, forming a first coil having a pancake coil configuration on a first layer, the first layer on the substrate, forming a first portion of a second coil on the first layer, the second coil having a helical coil configuration, and forming a second portion of the second coil on a second layer, the second layer on the first layer, where the first coil and the second coil are coupled to form a hybrid coil, and where the first coil and the second coil are interleaved on the first layer.

DETAILED DESCRIPTION

Figure 1:
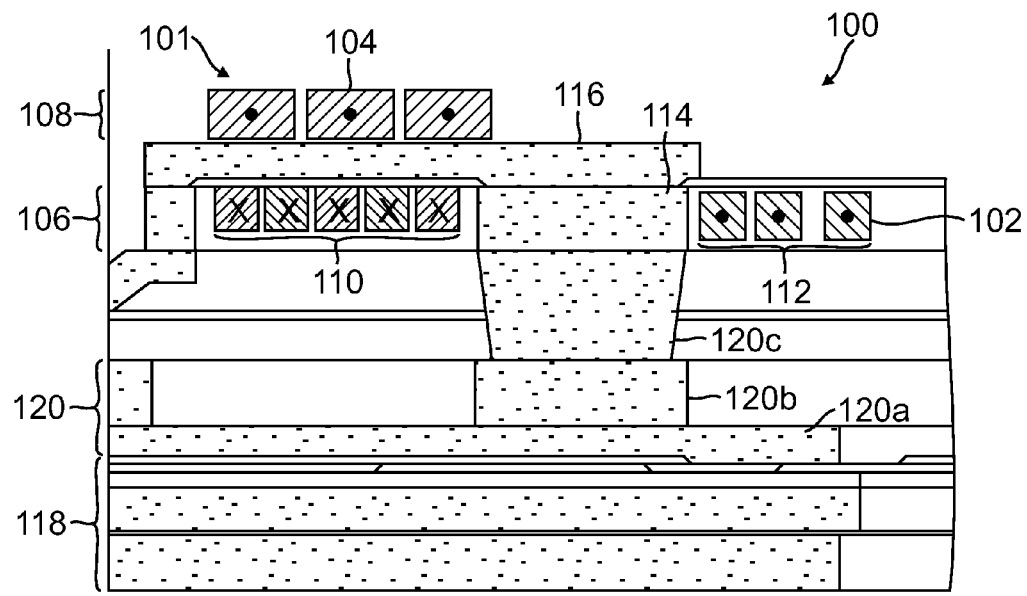
FIG. 1 is a cross sectional view of a read/write head for a storage system, where the head includes a two layer hybrid coil having a pancake coil in a pancake configuration coupled and interleaved with a helical coil in a helical configuration in accordance with one embodiment of the invention.

Referring now to the drawings, embodiments of read/write heads having hybrid coils and processes for manufacturing hybrid coils are illustrated. The hybrid coils include a pancake coil, having turns positioned around a write pole of the read/write head along a horizontal direction, and a helical coil coupled to the pancake coil and having turns along a vertical direction. One or more turns of the helical coil and one or more turns of the pancake coil are interleaved. The hybrid coils can have a two layer structure where the pancake coil and a lower layer section of the helical coil are positioned on a lower layer, and an upper layer section of the helical coil is positioned on an upper layer of the coil structure. The two layer structure can provide desirable magnetic writing characteristics such as low inductance and resistance, while maintaining short yoke length. In addition, processes for manufacturing the two layer hybrid coil structure can reduce the number of steps required to form the coil structure, thereby providing for efficient manufacturing, as compared to conventional coil manufacturing processes.

FIG. 1 is a cross sectional view of a read/write head 100 for a storage system, where the head 100 includes a two layer hybrid coil 101 having a pancake coil 102 in a pancake configuration coupled and interleaved with a helical coil 104 in a helical configuration in accordance with one embodiment of the invention. The two layer hybrid coil 101 includes a lower layer 106 and an upper layer 108. The lower layer 106 includes all of the turns of the pancake coil 102 and three turns of a lower layer section of the helical coil 104.

Figure 2:
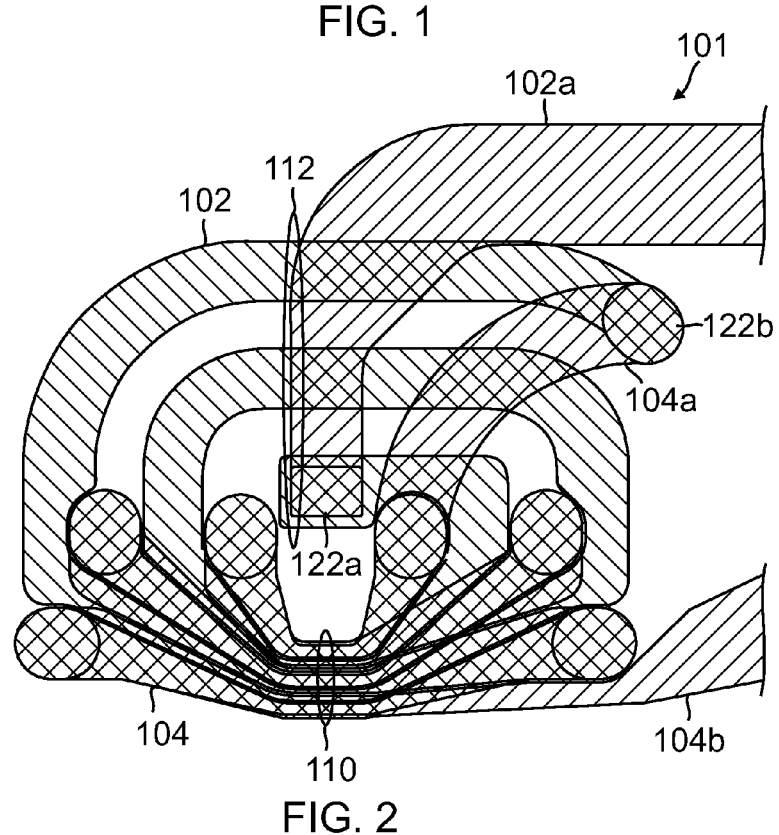
FIG. 2 is a top view of the hybrid coil of FIG. 1 where an upper layer section of the helical coil, positioned above a lower layer section of the helical coil and the pancake coil, is shown as being transparent to illustrate the two layer configuration and coupling of the hybrid coil in accordance with one embodiment of the invention.

FIG. 2 is a top view of the hybrid coil 101 of FIG. 1 where an upper layer section of the helical coil 104, positioned above the lower layer section of the helical coil and the pancake coil, is shown as being transparent to illustrate the two layer configuration and coupling of the hybrid coil 101 in accordance with one embodiment of the invention.

Referring now to both FIG. 1 and FIG. 2, the lower layer 106 also includes an interleaved section 110 where turns of the pancake coil 102 are interleaved with turns of the helical coil 104. The lower layer 106 also includes a non-interleaved section 112 including turns of the pancake coil 102. The turns of the pancake coil 102 are wrapped around a component 114 of the main pole of head 100, while the turns of the helical coil 104 are wrapped around the yoke 116 of the main pole. The pancake coil 102 has three turn segments in the non-interleaved section 112 extending into two turn segments in the interleaved section 110. The helical coil 104 has exactly three turn segments in each of the lower layer 106 and the upper layer 108.

Referring now to FIG. 1, the head 100 also includes a read head assembly 118 and a return pole 120 positioned on the read head assembly 118. The remaining components of the head 100 can make up the write head assembly. The return pole 120 includes a return pole substrate 120a, a return pole component 120b, and a back via 120c.

Referring now to FIG. 2, the width of the turn segments of the pancake coil 102 in the non-interleaved section 112 is substantially greater than the width of the turn segments of the pancake coil 102 in the interleaved section 110. The relatively tight spacing in the interleaved section 110 allows for turns of both the pancake and helical coils to be closely interleaved. Related designs of coils often require spacing of about 0.4 to 0.5 microns. By interleaving the pancake and helical coils, the interleaved section can have spacing between turns about as small as 0.1 micron. As a result, the yoke length can be decreased along with the overall length of the hybrid coil yielding lowered inductance.

In operation, current can enter the hybrid coil 101 through an entry segment (e.g., first terminal) 102a on the upper layer 108 and pass through a first via 122a to the pancake coil 102 on the lower layer 106. The current then passes through each of the turns of the pancake coil 102, before exiting by way of a second via 122b and a jumper segment 104a on the upper layer 108 to the helical coil 104. In passing through the helical coil 104, the current flows through turns of the helical coil 104 on both the upper layer 108 and the lower layer 106 and through multiple vias coupling the those turns on the separated layers. The current then exits the last turn 104b (e.g., exit segment or exit terminal) of the helical coil 104 on the upper layer 108.

In the embodiment illustrated in FIGS. 1 and 2, the helical coil 104 has three turns. In other embodiments, the helical coil can have more than or less than three turns. In the embodiment illustrated in FIGS. 1 and 2, the pancake coil 102 has three turns (e.g., three turn segments in the non-interleaved section 112 extending into two turn segments in the interleaved section 110). In other embodiments, the pancake coil can have more than or less than three turns. In the embodiment illustrated in FIGS. 1 and 2, the entry segment 102a and exit segment 104b are both on the upper layer 108. In other embodiments, the entry segment 102a and exit segment 104b can be arranged in different configurations on the upper layer 108 and the lower layer 106.

Figure 3A:
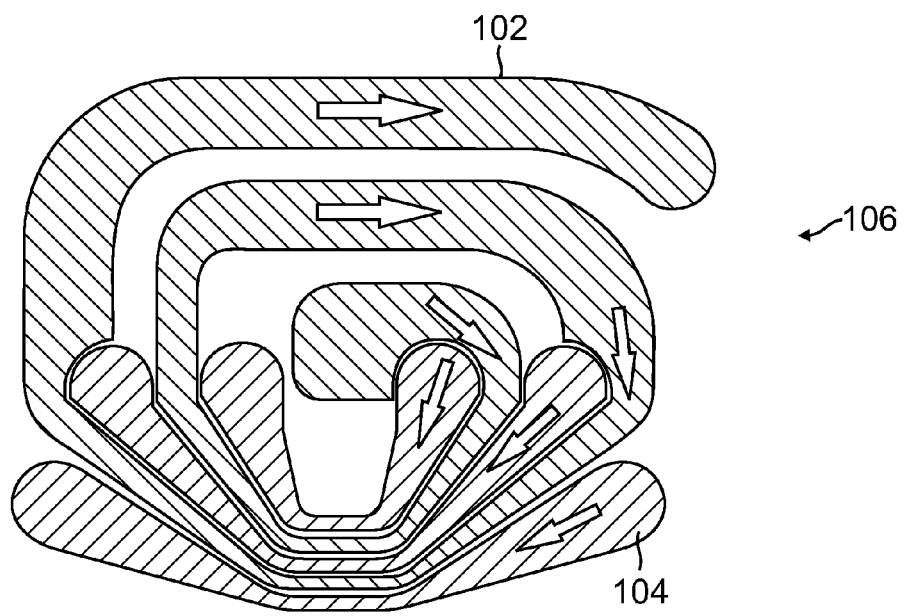
FIG. 3a is a top view of the lower layer of the hybrid coil of FIG. 1 which includes the pancake coil and the lower layer section of the helical coil in accordance with one embodiment of the invention.

FIG. 3a is a top view of the lower layer 106 of FIG. 1 which includes the pancake coil 102 and the lower layer section of the helical coil 104 in accordance with one embodiment of the invention. The arrows indicate the direction of current flowing through the lower layer hybrid coil sections.

Figure 3B:
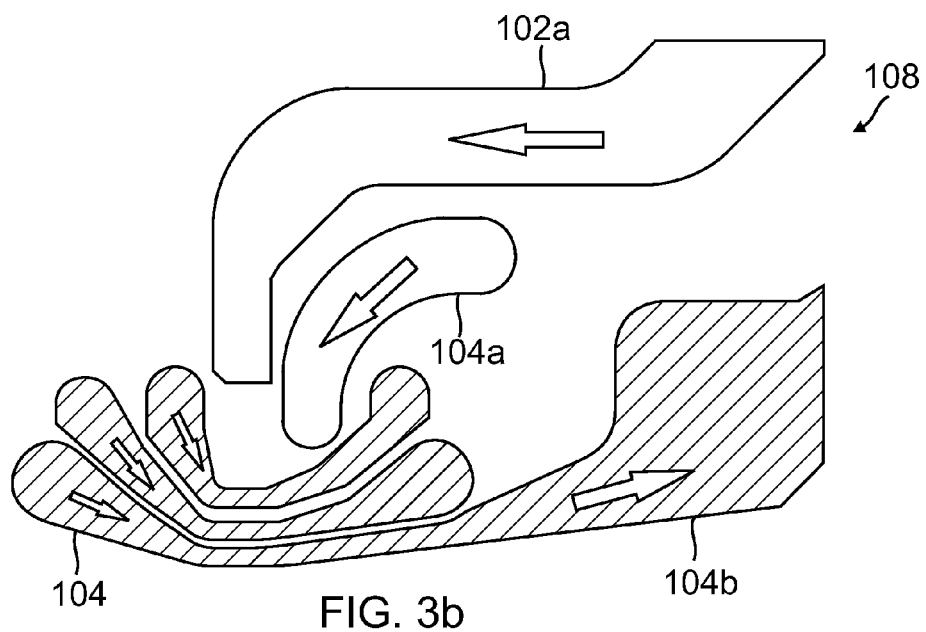
FIG. 3b is a top view of the upper layer of the hybrid coil of FIG. 1 which includes the upper layer section of the helical coil, a first terminal and a second terminal of the hybrid coil in accordance with one embodiment of the invention.

FIG. 3b is a top view of the upper layer 108 of the hybrid coil 101 of FIG. 1 which includes the second layer section of the helical coil 104, a first terminal 102a (e.g., entry segment) and a second terminal 104b (e.g., exit segment) of the hybrid coil 101 in accordance with one embodiment of the invention. The arrows indicate the direction of current flowing through the upper layer hybrid coil sections.

Figure 4:
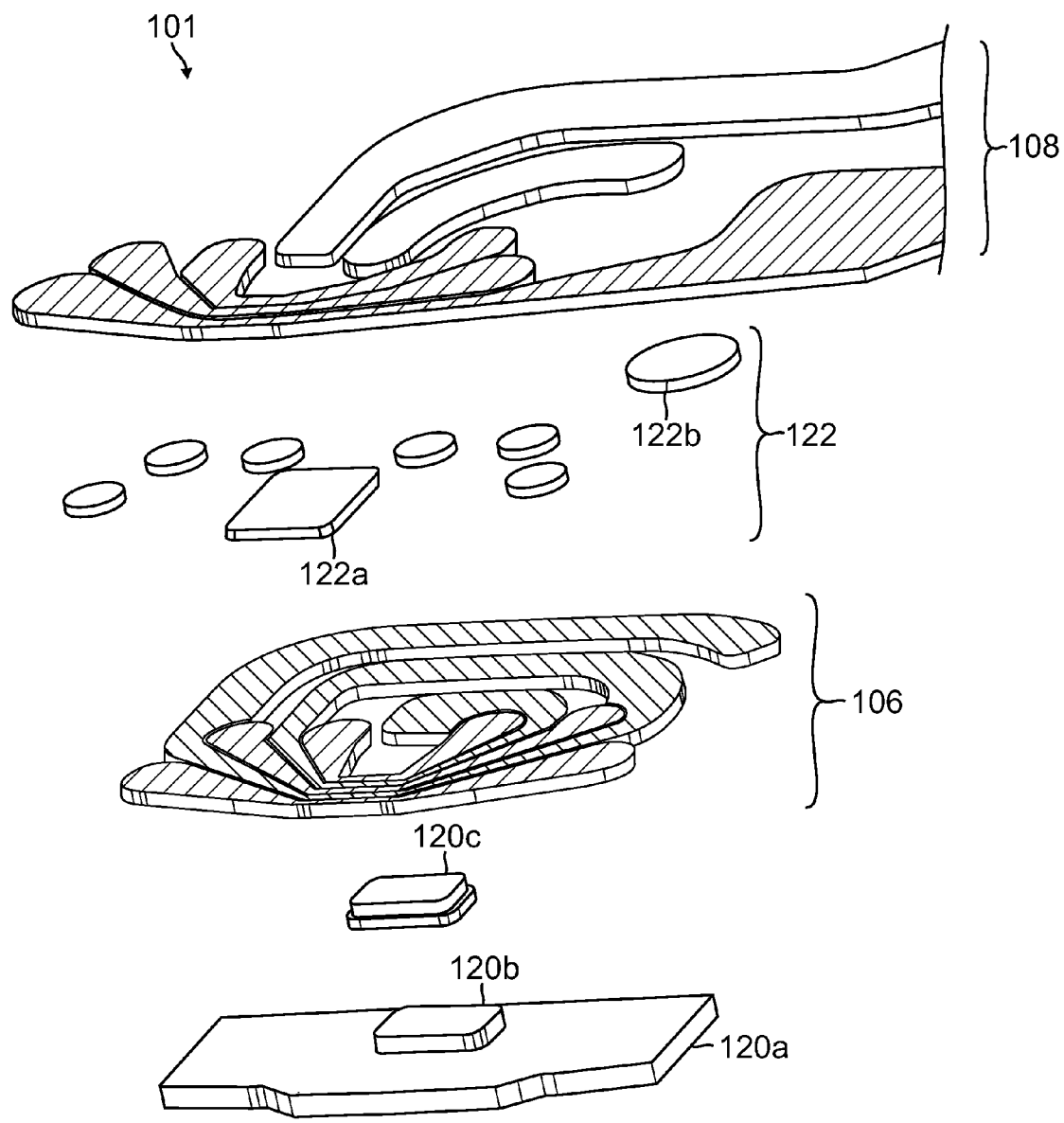
FIG. 4 is an exploded perspective view of the hybrid coil of FIG. 1 illustrating the lower layer, the upper layer, and coil vias for making electrical connections between the layers in accordance with one embodiment of the invention.

FIG. 4 is an exploded perspective view of the hybrid coil 101 of FIG. 1 illustrating the lower layer 106, the upper layer 108, and coil vias 122 for making electrical connections between the layers in accordance with one embodiment of the invention. In addition, several components of the return pole 120 are illustrated, including the return pole substrate 120a, the return pole component 120b, and the back via 120c. In several embodiments, the coil vias 122 are disposed within an insulation layer positioned between the lower layer 106 and the upper layer 108.

Figure 5:
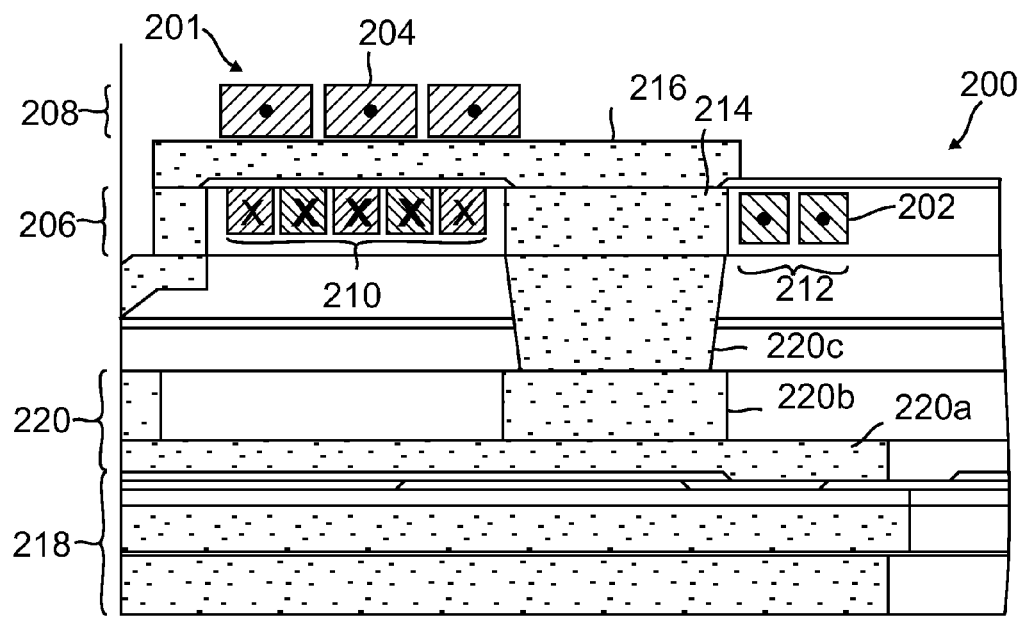
FIG. 5 is a cross sectional view of another read/write head for a storage system, where the head includes another two layer hybrid coil having a pancake coil in a pancake configuration coupled and interleaved with a helical coil in a helical configuration in accordance with one embodiment of the invention.

FIG. 5 is a cross sectional view of a read/write head 200 for a storage system, where the head 200 includes another two layer hybrid coil 201 having a pancake coil 202 in a pancake configuration coupled and interleaved with a helical coil 204 in a helical configuration in accordance with one embodiment of the invention. The two layer hybrid coil 201 includes a lower layer 206 and an upper layer 208. The lower layer 206 includes all of the turns of the pancake coil 202 and three turns of a lower layer section of the helical coil 204.

Figure 6:
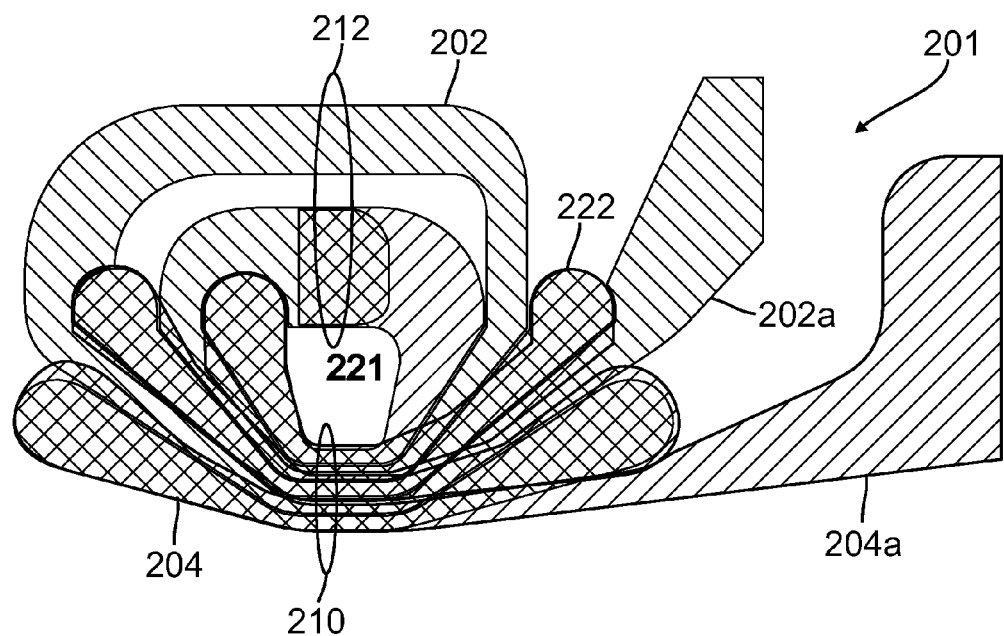
FIG. 6 is a top view of the hybrid coil of FIG. 5 where an upper layer section of the helical coil, positioned above a lower layer section of the helical coil and the pancake coil, is shown as being transparent to illustrate the two layer configuration and coupling of the hybrid coil in accordance with one embodiment of the invention.

FIG. 6 is a top view of the hybrid coil 201 of FIG. 5 where an upper layer section of the helical coil 204, positioned above the lower layer section of the helical coil 204 and the pancake coil 202, is shown as being transparent to illustrate the two layer configuration and coupling of the hybrid coil 201 in accordance with one embodiment of the invention.

Referring now to both FIG. 5 and FIG. 6, the lower layer 206 also includes an interleaved section 210 where turns of the pancake coil 202 are interleaved with turns of the helical coil 204. The lower layer 206 also includes a non-interleaved section 212 including turns of the pancake coil 202. The turns of the pancake coil 202 are wrapped around a component 214 of the main pole of head 200, while the turns of the helical coil 204 are wrapped around the yoke 216 of the main pole.

The pancake coil 202 has two turn segments in the non-interleaved section 212 extending into two turn segments in the interleaved section 210. The helical coil 204 has exactly three turn segments in each of the lower layer 206 and the upper layer 206.

Referring now to FIG. 5, the head 200 also includes a read head assembly 218 and a return pole 220 positioned on the read head assembly 218. The remaining components of the head 200 can make up the write head assembly. The return pole 220 includes a return pole substrate 220a, a return pole component 220b, and a back via 220c.

Referring now to FIG. 6, the width of the turn segments of the pancake coil 202 in the non-interleaved section 212 is substantially greater than the width of the turn segments of the pancake coil 202 in the interleaved section 210. The relatively tight spacing in the interleaved section 210 allows for turns of both the pancake and helical coils to be closely interleaved. In operation, current can enter the hybrid coil 201 through an entry segment 202a (e.g., first terminal) on the lower layer 206 and pass through the turns of the pancake coil 202 and exit to a coupling section 221 before entering the helical coil 204. In passing through the helical coil 204, the current flows through turns of the helical coil 204 on both the upper layer 208 and the lower layer 206 and through multiple vias 222 coupling the those turns on the separated layers. The current then exits the last turn 204a (e.g., exit segment or exit terminal) of the helical coil 204 on the upper layer 208.

In the embodiment illustrated in FIGS. 5 and 6, the helical coil 204 has three turns. In other embodiments, the helical coil can have more than or less than three turns. In the embodiment illustrated in FIGS. 5 and 6, the pancake coil 202 has two turns (e.g., two turn segments in the non-interleaved section 212 extending into two turn segments in the interleaved section 210). In other embodiments, the pancake coil can have more than or less than two turns. In the embodiment illustrated in FIGS. 5 and 6, the entry segment 202a is positioned on the lower layer and the exit segment 204b is positioned on the upper layer 208. In other embodiments, the entry segment 202a and exit segment 204b can be arranged in different configurations on the upper layer 208 and the lower layer 206.

Figure 7A:
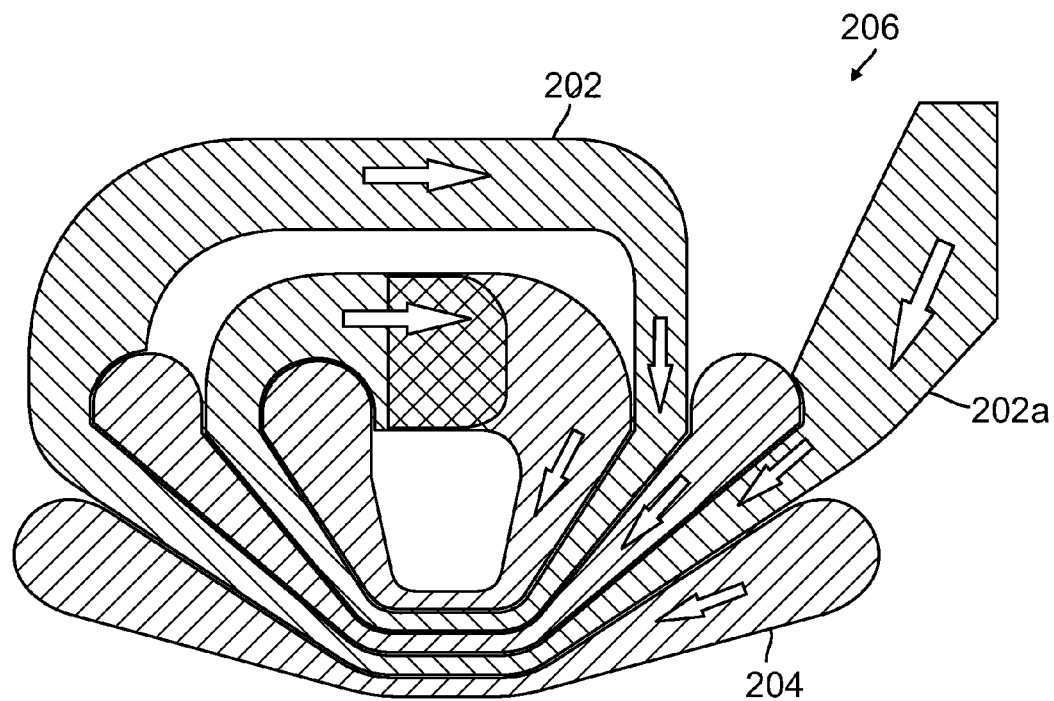
FIG. 7a is a top view of the lower layer of the hybrid coil of FIG. 5 which includes the pancake coil, the lower layer section of the helical coil, and a first terminal of the hybrid coil in accordance with one embodiment of the invention.

FIG. 7a is a top view of the lower layer 206 of the hybrid coil 201 of FIG. 5 which includes the pancake coil 202, the first layer section of the helical coil 204 and an entry terminal 202a in accordance with one embodiment of the invention. The arrows indicate the direction of current flowing through the lower layer hybrid coil sections.

Figure 7B:
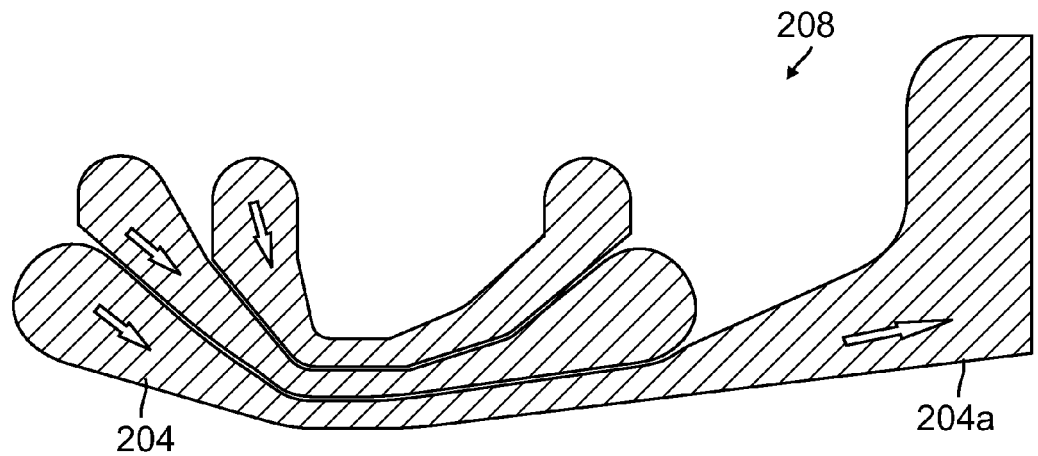
FIG. 7b is a top view of the upper layer of the hybrid coil of FIG. 5 which includes the upper layer section of the helical coil and a second terminal of the hybrid coil in accordance with one embodiment of the invention.

FIG. 7b is a top view of the upper layer 208 of the hybrid coil 201 of FIG. 5 which includes the upper layer section of the helical coil 204 and an exit terminal 204a of the hybrid coil 201 in accordance with one embodiment of the invention. The arrows indicate the direction of current flowing through the upper layer hybrid coil sections.

Figure 8:
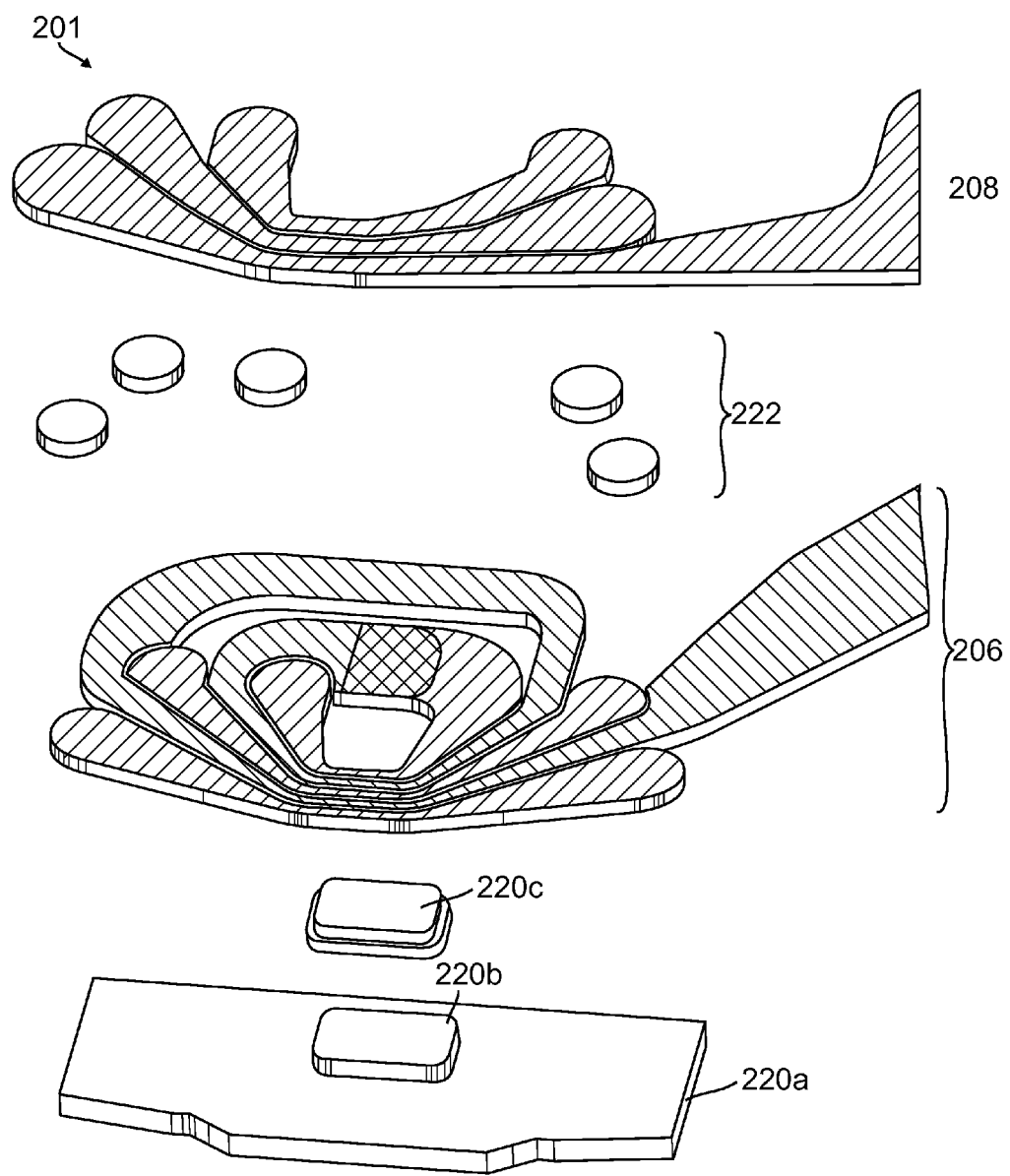
FIG. 8 is an exploded perspective view of the hybrid coil of FIG. 5 illustrating the lower layer, the upper layer, and coil vias for making electrical connections between the layers in accordance with one embodiment of the invention.

FIG. 8 is an exploded perspective view of the hybrid coil 201 of FIG. 5 illustrating the lower layer 206, the upper layer 208, and coil vias 222 for making electrical connections between the layers in accordance with one embodiment of the invention. In addition, several components of the return pole 220 are illustrated, including the return pole substrate 220a, the return pole component 220b, and the back via 220c. In several embodiments, the coil vias 222 are disposed within an insulation layer positioned between the lower layer 206 and the upper layer 208.

Figure 9:
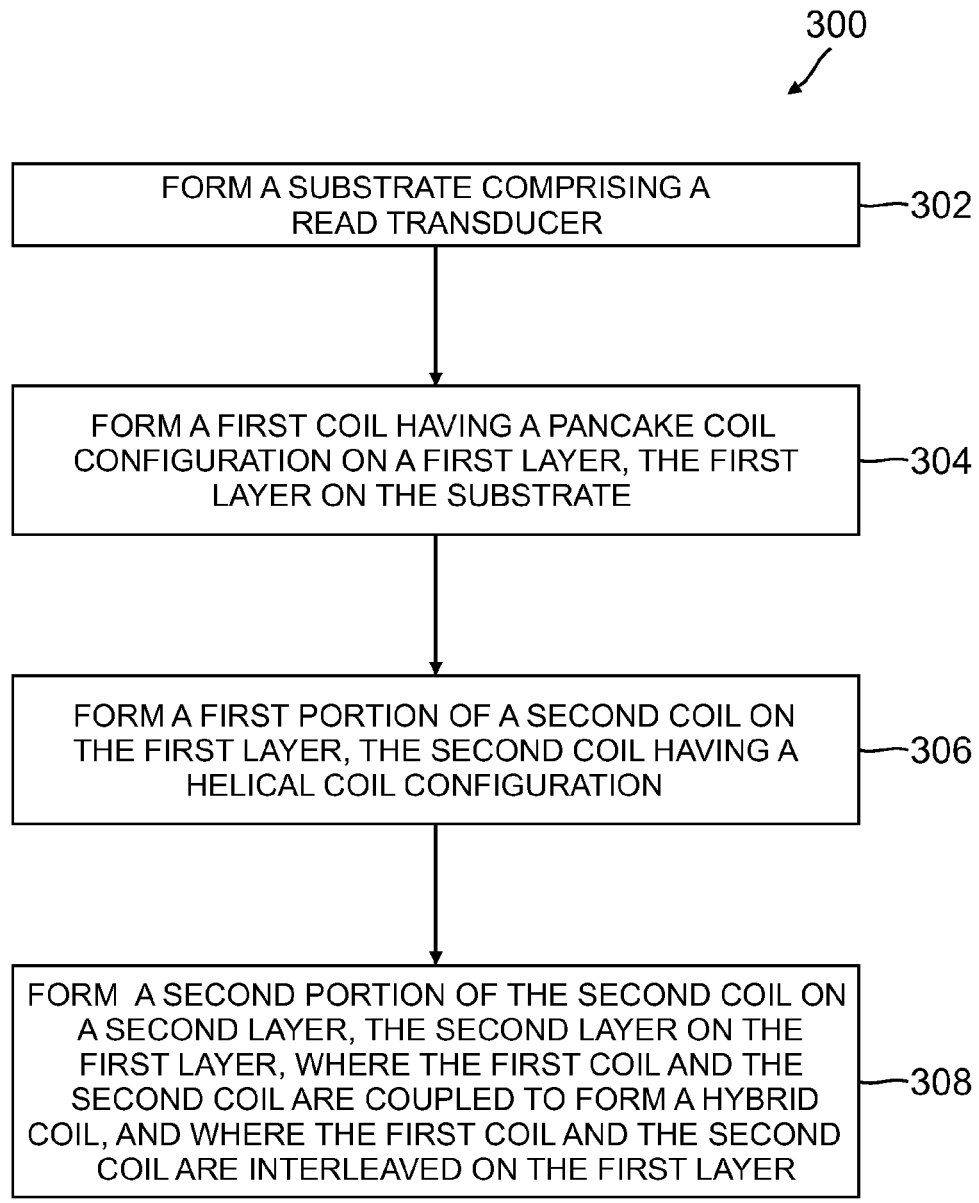
FIG. 9 is a flowchart of a process for manufacturing a hybrid coil in accordance with one embodiment of the invention.

FIG. 9 is a flowchart of a process 300 for manufacturing a hybrid coil in accordance with one embodiment of the invention. In several embodiments, the process 300 can be used to form the hybrid coils of FIG. 1 and FIG. 5. The process first forms (302) a substrate including a read transducer. The process then forms (304) a first coil having a pancake coil configuration on a first layer, the first layer on the substrate. The process then forms (306) a first portion of a second coil on the first layer, the second coil having a helical coil configuration. The process forms (308) a second portion of the second coil on a second layer, the second layer on the first layer, where the first coil and the second coil are coupled to form a hybrid coil, and where the first coil and the second coil are interleaved on the first layer.

In some embodiments, after block 306, the process forms an intervening layer including a top yoke of a write transducer on the first layer, and forms the second layer on the intervening layer. In several embodiments, after block 304, the process forms a first insulation layer to insulate the first coil from the second coil on the first layer. The first insulation layer can include alumina and/or resist. In one embodiment, the thickness of the alumina ranges from 0.1 to 0.2 microns, and the thickness of the resist ranges from 0.4 to 0.5 microns. In one embodiment, the alumina includes Al2O3, and the resist is a standard resist provided by MicroChem Corporation of Newton, Mass. (e.g., under the trade name SU8), Clariant Corporation of Charlotte, N.C. (e.g., under the trade name AZ), Shin-Etsu Chemical Co., Ltd. (e.g., under the trade name SIPR 7121), or another suitable resist.

In several embodiments, the process can planarize the first portion using a chemical mechanical planarization process. In some embodiments, the process can also form a plurality of coil vias configured to couple the first portion of the helical coil to the second portion of the helical coil. In a number of embodiments, the process also forms a second insulation layer on the second layer to insulate turns of the second portion of the helical coil, and planarizes at least one turn of the second portion using a chemical mechanical planarization process.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for manufacturing a magnetic read/write head of a storage system, the method comprising:
   forming a substrate comprising a read transducer;
   forming a first coil having a pancake coil configuration on a first layer, the first layer on the substrate;
   forming a first portion of a second coil on the first layer, the second coil having a helical coil configuration; and forming a second portion of the second coil on a second layer, the second layer on the first layer, wherein the first coil and the second coil are coupled to form a hybrid coil, and wherein the first coil and the second coil are interleaved on the first layer.

2. The method of claim 1, wherein the forming the first portion of the second coil on the first layer further comprises forming an intervening layer comprising a top yoke of a write transducer on the first layer, and forming the second layer on the intervening layer.

3. The method of claim 1, wherein the forming the first coil having the pancake coil configuration on the first layer further comprises forming a first insulation layer to insulate the first coil from the second coil on the first layer.

4. The method of claim 3, wherein the first insulation layer is comprised of a material selected from the group consisting of alumina and resist.

5. The method of claim 4:

wherein a thickness of the alumina ranges from 0.1 to 0.2 microns, and wherein a thickness of the resist ranges from 0.4 to 0.5 microns.

6. The method of claim 1, wherein the forming the first portion of the second coil on the first layer further comprises planarizing the first portion using a chemical mechanical planarization process.

7. The method of claim 1, further comprising forming a plurality of coil vias configured to couple the first portion to the second portion.

8. The method of claim 1, wherein the forming the second portion of the second coil on the second layer, the second layer on the first layer comprises:

forming a second insulation layer on the second layer to insulate turns of the second portion of the second coil; and planarizing at least one turn of the second portion using a chemical mechanical planarization process.

9. The method of claim 1, wherein the first coil comprises at least one turn and the second coil comprises a plurality of turns.

10. The method of claim 9, wherein the first coil comprises a plurality of turns and the second coil comprises at least three turns.

11. The method of claim 10, wherein the turns of the first coil are interleaved with the turns of the second coil.

12. The method of claim 9, wherein the first coil consists of two turns and the second coil consists of three turns.

13. The method of claim 9, wherein the first coil comprises an interleaved section and a non-interleaved section, wherein a width of the at least one turn of the first coil in the interleaved section is less than a width of the at least one turn of the first coil in the non-interleaved section.

14. The method of claim 9, wherein the second coil comprises an interleaved section and a non-interleaved section, wherein a width of turns of the second coil in the interleaved section is less than a width of turns of the second coil in the non-interleaved section.

15. The method of claim 1, further comprising forming a jumper and a plurality of coil vias couple the first coil and the second coil.

16. The method of claim 1, wherein the hybrid coil comprises a first terminal on the second layer and a second terminal on the second layer.

17. The method of claim 1, wherein the hybrid coil comprises a first terminal on the first layer and a second terminal on the second layer.

18. The method of claim 1, wherein at least one turn of the second coil is wrapped around a top yoke of a write transducer.

* * * * *